United States Patent
Saito

(10) Patent No.: US 10,917,532 B2
(45) Date of Patent: Feb. 9, 2021

(54) IMAGE FORMING APPARATUS WITH ALTERNATIVE IMAGE FORMING APPARATUS SELECTION

(71) Applicant: RISO KAGAKU CORPORATION, Tokyo (JP)

(72) Inventor: Reina Saito, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 16/354,656

(22) Filed: Mar. 15, 2019

(65) Prior Publication Data
US 2019/0364161 A1  Nov. 28, 2019

(30) Foreign Application Priority Data
May 25, 2018  (JP) ................................. 2018-100528

(51) Int. Cl.
*H04N 1/00* (2006.01)

(52) U.S. Cl.
CPC ..... *H04N 1/00408* (2013.01); *H04N 1/00204* (2013.01)

(58) Field of Classification Search
None
See application file for complete search history.

(56) References Cited

U.S. PATENT DOCUMENTS

| | | | |
|---|---|---|---|
| 6,452,692 B1 * | 9/2002 | Yacoub | G06F 3/1204 358/1.13 |
| 2016/0219165 A1 * | 7/2016 | Iezaki | G02B 27/017 |
| 2017/0099570 A1 * | 4/2017 | Yamada | H04W 4/80 |

FOREIGN PATENT DOCUMENTS

| | | |
|---|---|---|
| CN | 103946734 | 7/2014 |
| CN | 104079748 | 10/2014 |
| CN | 106168888 | 11/2016 |
| CN | 106325495 | 1/2017 |
| JP | 2007114298 A | 5/2007 |
| JP | 5821738 B2 | 11/2015 |

OTHER PUBLICATIONS

The Extended European Search Report issued in European Patent Application No. 19163114.2 dated Sep. 30, 2019, 8 pages.
Office Action issued in the counterpart Chinese application No. 201910205223.4, dated Aug. 5, 2020, 17 pages including machine translation.

* cited by examiner

*Primary Examiner* — Andrew H Lam
(74) *Attorney, Agent, or Firm* — Hamre, Schumann, Mueller & Larson, P.C.

(57) ABSTRACT

A print system includes an image forming apparatus and a wearable terminal configured to communicate with the image forming apparatus. The image forming apparatus includes a detector configured to detect an error and a controller configured to send a guidance information used to remove the error to the wearable terminal. The wearable terminal includes a transmissive display, a fixing portion configured to fix the transmissive display in front of eyes of a user, a communication unit configured to receive the guidance information, and a display controller configured to display the guidance information on the transmissive display for the image forming apparatus viewed through the transmissive display.

9 Claims, 16 Drawing Sheets

FIG. 6

| ERROR ID | JAM CONDITION | | GUIDANCE INFORMATION | | |
|---|---|---|---|---|---|
| | SHEET POSITION | SHEET CONDITION | GUIDANCE TEXT | GUIDANCE IMAGE | DISPLAY POSITION OF GUIDANCE IMAGE |
| 302 | IN INK TRANSFER MECHANISM | WRAPPED AROUND TRANSFER BELT | PULL OUT SHEET TOWARD USER | ▭ | AT END OF TRANSFER BELT |
| | | | | ⇨ | IN FRONT OF TRANSFER BELT |

FIG. 13

| ID | NAME | TYPE | POSITION INFORMATION | FLOOR |
|---|---|---|---|---|
| PRT09-002 | FOR DEVELOPMENT DEPARTMENT | COLOR | (x2,y10) | 9F |
| PRT09-003 | FOR DEVELOPMENT DEPARTMENT(2) | BLACK AND WHITE | (x10,y10) | 9F |
| PRT10-001 | FOR CONFERENCE ROOM | COLOR | (x5,y5) | 10F |
| . | | | . | ... |

IMAGE FORMING APPARATUS WITH ALTERNATIVE IMAGE FORMING APPARATUS SELECTION

CROSS REFERENCE TO RELATED APPLICATION

This application is based upon and claims the benefit of priority from the prior Japanese Patent Application No. 2018-100528, filed on May 25, 2018, the entire contents of which are incorporated herein by reference.

BACKGROUND

1. Technical Field

The disclosure relates to a technique of displaying guidance information on a printer.

2. Related Art

When jam occurs in printing, information for removing the jam is displayed on an operation panel of a printer. However, since the operation panel is provided in an upper portion of the printer, a printer user who tries to remove the jam by looking at a sheet conveyance route located in a lower portion of the printer has to move back and forth between the operation panel and a portion where the jam has occurred.

In view of this, Japanese Patent Application Publication No. 2007-114298 proposes a method in which steps of removing a jammed sheet are printed on a sheet and a user performs work of removing the jammed sheet by referring to the printed sheet in his or her hand. Japanese Patent No. 5821738 proposes a method in which an operation panel removed from a printer functions as a mobile terminal device and, when a printer user captures an image of a jam occurrence portion in a sheet conveyance route with the mobile terminal device, a guidance image for jam removal operation guidance is generated and displayed in a manner superimposed on a captured image of the printer.

SUMMARY

In Japanese Patent Application Publication No. 2007-114298, since the steps of removing jammed sheet are printed on a sheet, a printed sheet is generated every time jam occurs and sheets and ink are wastefully consumed. In Japanese Patent No. 5821738, since the printer user needs to capture the image of the jam occurrence portion with the mobile terminal device, the printer user has to perform the jam removal operation only with one hand while capturing the image of the jam occurrence portion by holding the mobile terminal device with the other hand.

The disclosure is directed to a technique of improving operability of a printer in the case where an error of the printer is to be removed.

A print system in accordance with some embodiments includes an image forming apparatus and a wearable terminal configured to communicate with the image forming apparatus. The image forming apparatus includes a detector configured to detect an error and a controller configured to send a guidance information used to remove the error to the wearable terminal. The wearable terminal includes a transmissive display, a fixing portion configured to fix the transmissive display in front of eyes of a user, a communication unit configured to receive the guidance information, and a display controller configured to display the guidance information on the transmissive display for the image forming apparatus viewed through the transmissive display.

According to the aforementioned configuration, it is possible to improve operability of a printer in the case where an error of the printer is to be removed.

BRIEF DESCRIPTION OF DRAWINGS

FIG. 6 is a diagram illustrating an example of jam removal operation guidance information.

FIG. 13 is a diagram illustrating an example of other printer information.

DETAILED DESCRIPTION

Figure 1:
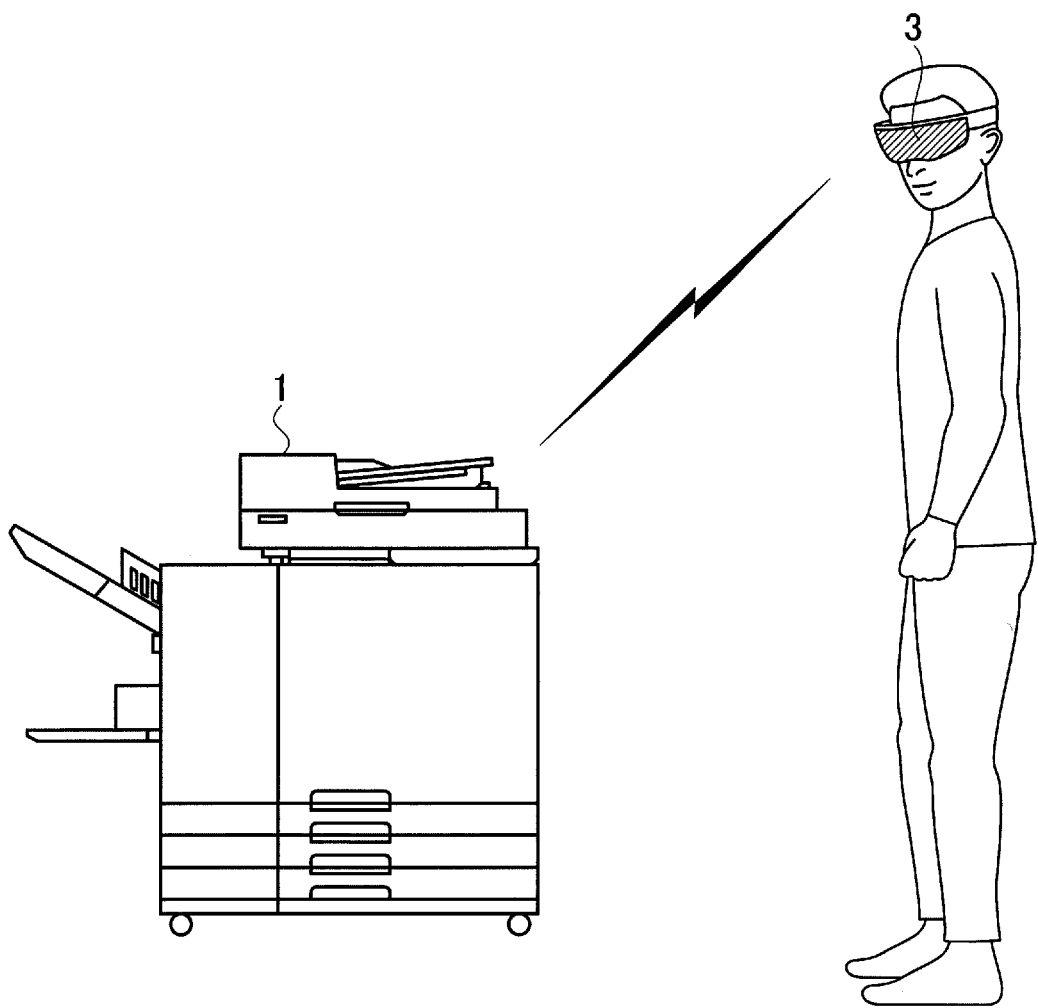
FIG. 1 is a view illustrating a configuration of a print system according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for an embodiment of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

Configuration of Print System

FIG. 1 is a view illustrating a configuration of a print system 100 according to this embodiment. The print system 100 includes a printer 1 and a wearable terminal 3. The printer 1 and the wearable terminal 3 are connected to each other via a wireless communication network to be capable of communicating with each other. The printer 1 is also connected to a computer terminal which is a source of a print request and another printer 101 via a wired communication network to be capable of communicating with one another.

By wearing the wearable terminal 3 on the head, a user can see error information of the printer 1 displayed in a virtual space in a manner superimposed on the printer 1 in an actual space through a transmissive display. The error information refers to various errors occurring in the printer 1 and includes all errors detectable by the printer 1. In the embodiment, description is given of an error detected when jam occurs and an error detected when an ink remaining amount is low.

Functions of Printing Apparatus

Figure 2:
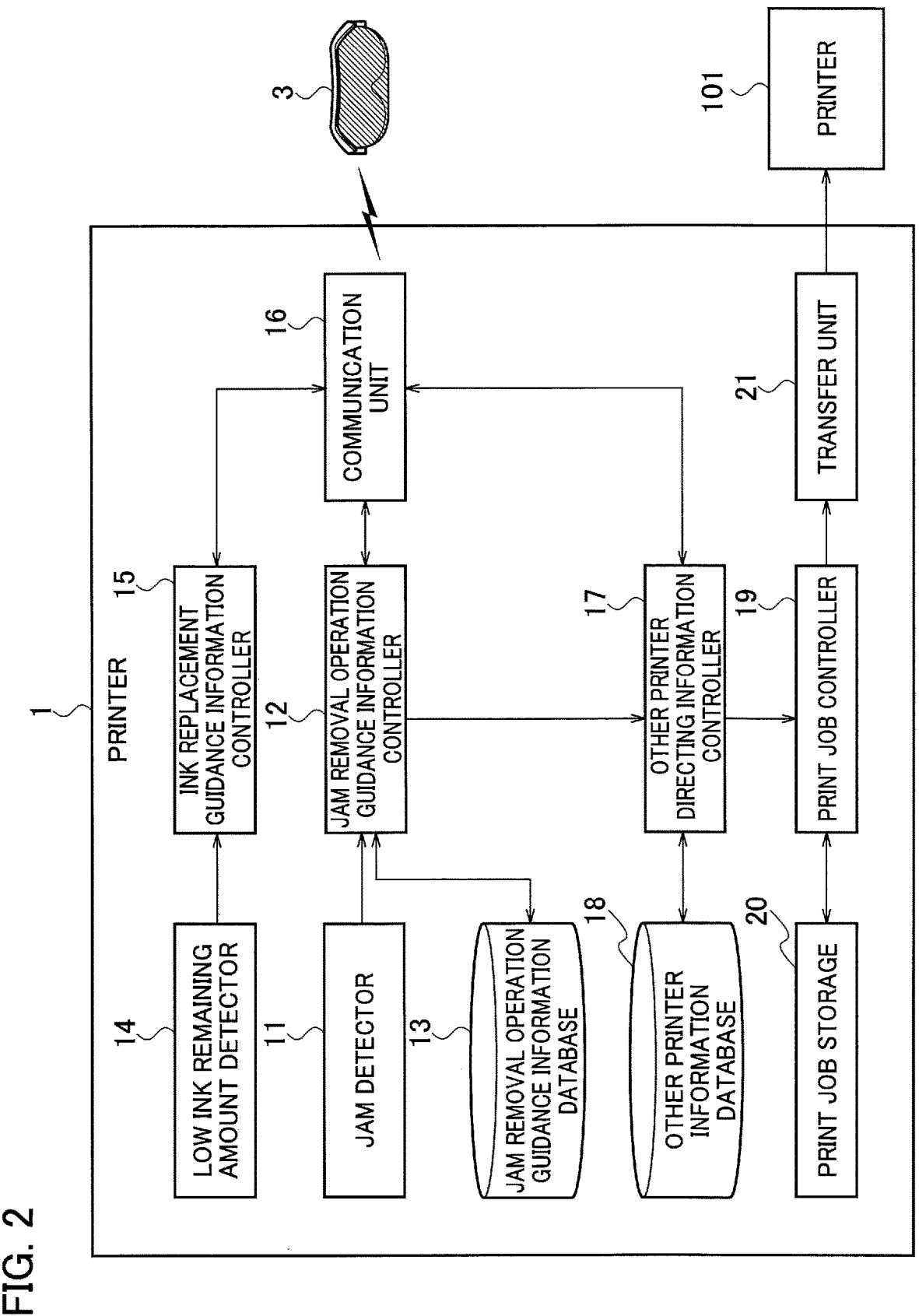
FIG. 2 is a diagram illustrating a function block configuration of a printer according to the embodiment.

FIG. 2 is a diagram illustrating a function block configuration of the printer 1. The printer 1 includes a jam detector 11, a jam removal operation guidance information controller 12, a jam removal operation guidance information database 13, a low ink remaining amount detector 14, an ink replacement guidance information controller 15, a communication unit 16, an other printer directing information controller 17, an other printer information database 18, a print job controller 19, a print job storage 20, and a transfer unit 21.

The jam detector (detector) 11 has a function of detecting occurrence of jam (jam occurrence error) in printing in the printer 1.

The jam removal operation guidance information controller (controller) 12 has a function of obtaining guidance information used to remove jam from the jam removal operation guidance information database 13 and sending the obtained guidance information to the wearable terminal 3 via the communication unit 16 as jam removal operation guidance information.

The jam removal operation guidance information database 13 has a function of storing the guidance information used to remove jam.

The low ink remaining amount detector (detector) 14 has a function of detecting that the remaining amount of the ink set in the printer 1 has reached or fallen below a threshold (low ink remaining amount error).

The ink replacement guidance information controller (controller) 15 has a function of sending ink replacement guidance information used to perform ink replacement to the wearable terminal 3 via the communication unit 16.

The communication unit 16 has a function of sending the jam removal operation guidance information outputted from the jam removal operation guidance information controller 12 to the wearable terminal 3. The communication unit 16 has a function of sending the ink replacement guidance information outputted from the ink replacement guidance information controller 15 to the wearable terminal 3.

The aforementioned functional units (11 to 16) function to make the user remove the errors in the case where jam occurs and in the case where the ink remaining amount is low. Meanwhile, the functional units described below (17 to 21) function to direct the user to the other printer 101 when jam occurs.

The other printer directing information controller 17 has a function of determining the usable other printer 101 and sending user directing information used to direct the user to the determined other printer 101 to the wearable terminal 3 via the communication unit 16.

The other printer information database 18 has a function of storing information on one or more other printers 101 connected to the printer 1 via the wired communication network to be capable of communicating with one another.

The print job controller 19 has a function of retrieving a target print job from the print job storage 20 and transferring the target print job to the other printer 101 determined by the other printer directing information controller 17 via the transfer unit 21.

The print job storage 20 has a function of storing the print job of print target data sent from the computer terminal which is the source of the print request.

The transfer unit 21 has a function of transferring the print job outputted from the print job controller 19 to the other printer 101 determined by the other printer directing information controller 17.

Functions of Wearable Terminal

Figure 3:
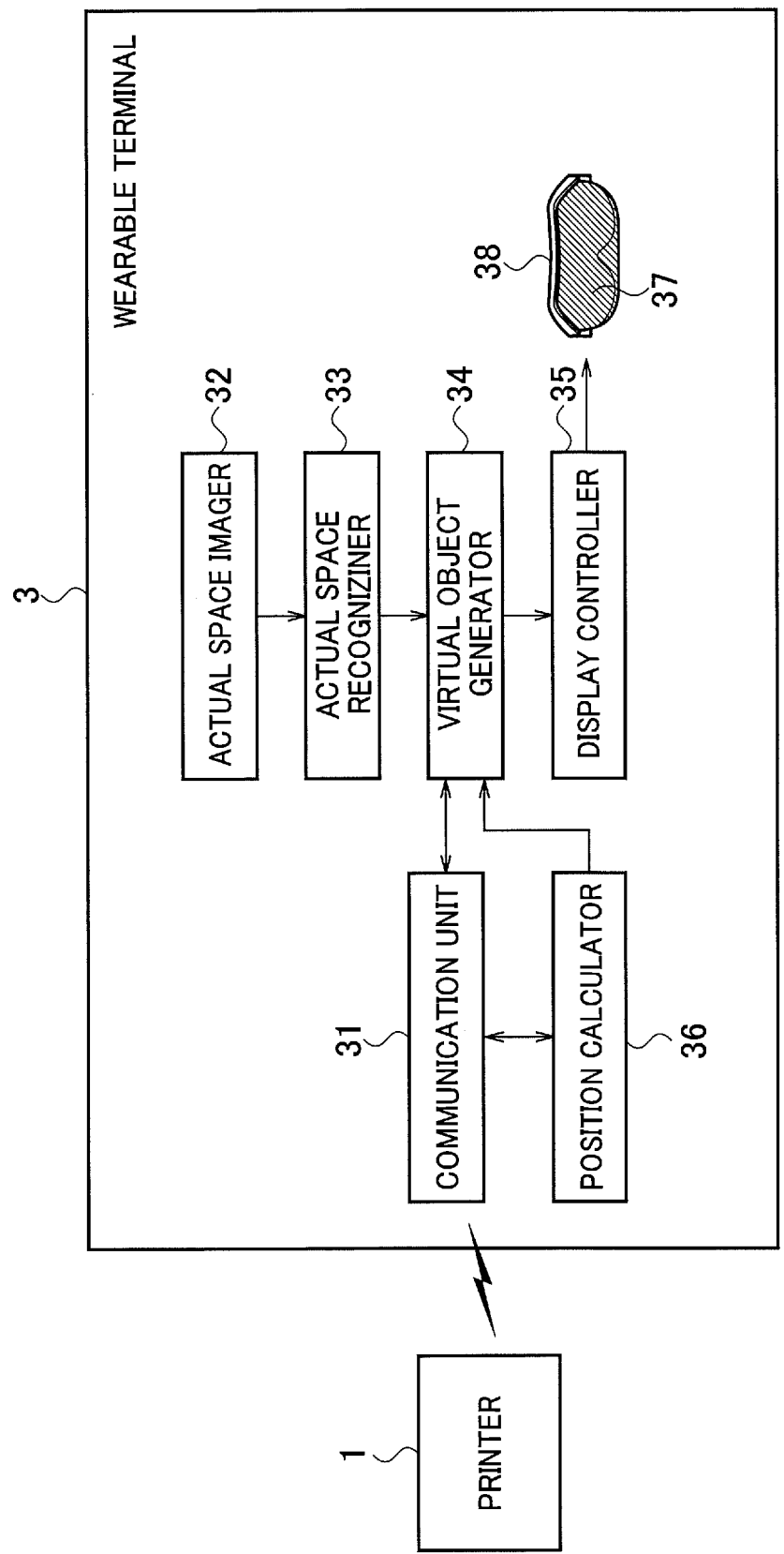
FIG. 3 is a diagram illustrating a function block configuration of a wearable terminal according to the embodiment.

FIG. 3 is a diagram illustrating a function block configuration of the wearable terminal 3. The wearable terminal 3 includes a communication unit 31, an actual space imager 32, an actual space recognizer 33, a virtual object generator 34, a display controller 35, a position calculator 36, a display 37, and a fixing portion 38.

The display 37 is a transmissive display and is fixed in front of the eyes of the user by using the fixing portion 38 such as a belt. The wearable terminal 3 is, for example, a head-mounted mixed reality (MR) device and can also utilize virtual reality (VR) technology and augmented reality (AR) technology.

The communication unit 31 has a function of receiving the jam removal operation guidance information, the ink replacement guidance information, and the user directing information sent from the printer 1.

The actual space imager 32 has a function of capturing an image of the actual space.

The actual space recognizer 33 has a function of recognizing the actual space captured by the actual space imager 32 by using a publicly-known actual space recognizing function. For example, the actual space recognizer 33 recognizes the shapes and positions of a desk, a chair, a ceiling, a wall, a face, and the like in the actual space.

The virtual object generator 34 has a function of generating virtual objects corresponding to the jam removal operation guidance information, the ink replacement guidance information, and the user directing information.

The display controller 35 has a function of displaying the jam removal operation guidance information and the ink replacement guidance information received via the communication unit 31 on the display 37 for the printer 1 viewed through the transmissive display 37. In other words, the display controller 35 displays the virtual objects of the jam removal operation guidance information and the ink replacement guidance information on the display 37 for the actual printer 1 viewed through the transmissive display 37.

Specifically, on the display 37, the display controller 35 displays the guidance information indicating a portion where jam has occurred in a manner highlighted and superimposed on the printer 1, displays the guidance information indicating a portion which needs to be operated to remove the jam in a manner highlighted and superimposed on the printer 1, and displays the guidance information indicating a method of jam removal operation. The display controller 35 may perform at least one of these display operations.

Specifically, on the display 37, the display controller 35 displays the guidance information indicating a portion requiring maintenance in a manner highlighted and superimposed on the printer 1 and displays the guidance information indicating a method of maintenance operation. The display controller 35 may perform at least one of these display operations.

Specifically, the display controller 35 displays the position of consumables requiring maintenance on the display 37 in a highlighted manner.

The display controller 35 has a function of displaying the user directing information for directing the user to the other printer 101 different from the printer 1 on the display 37, the user directing information received via the communication unit 31.

The position calculator 36 has a function of calculating the position of the wearable terminal 3.

Operations of Print System
(In Occurrence of Jam)

Operations performed when jam occurs are described. When jam occurs in the printer 1, the wearable terminal 3 receives notification via the communication network and displays the jam removal operation guidance information. When the user sees the printer 1 through the wearable terminal 3, a portion where the jam has occurred is displayed in a highlighted manner. A specific example of the processing is described below.

Figure 4:
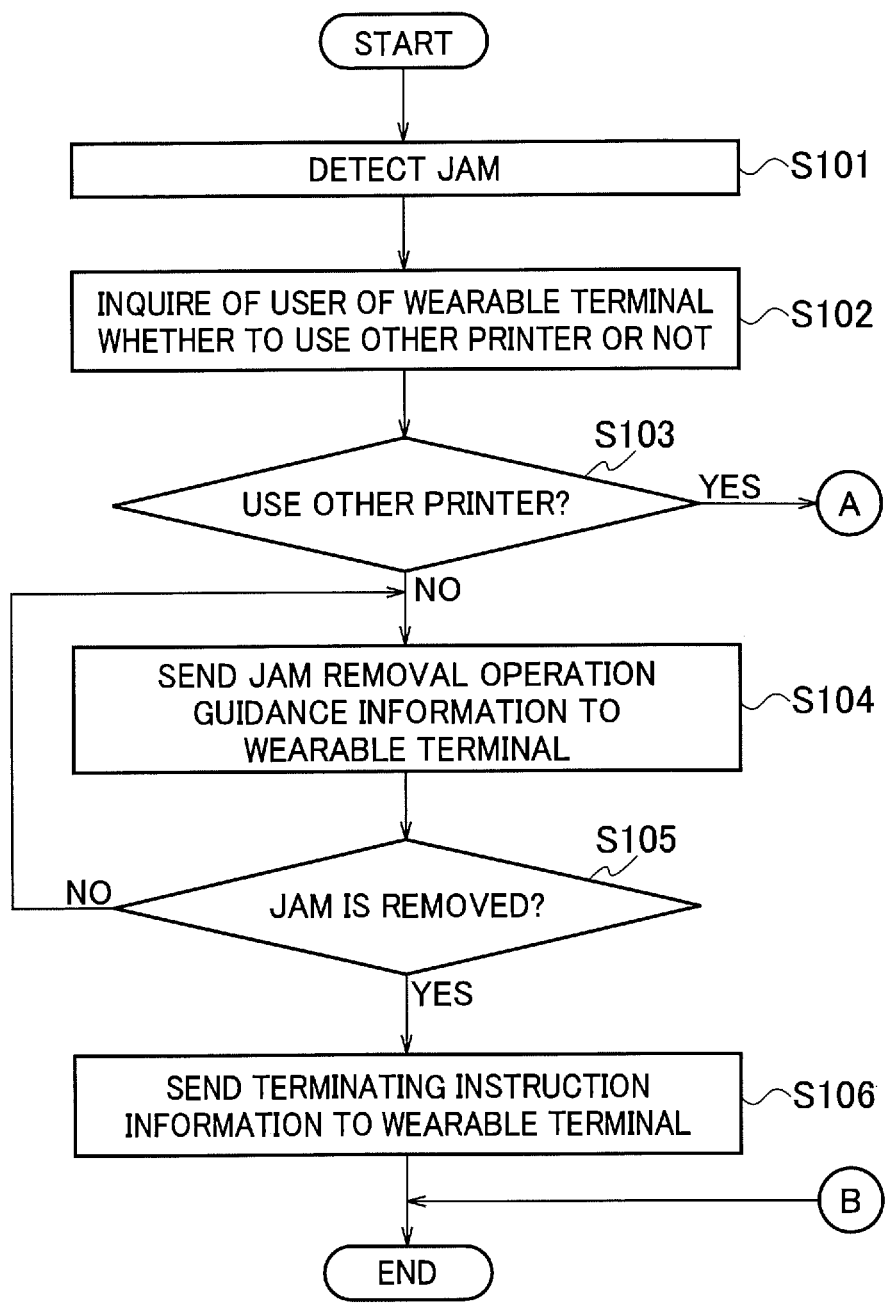
FIG. 4 is a diagram illustrating a processing flow of the printer in the case where jam occurs (the case where another printer is not used).

FIG. 4 is a diagram illustrating a processing flow (operation) of the printer 1 in the case where the jam occurs (the case where the other printer 101 is not used).

When the jam detector 11 detects occurrence of jam during printing in step S101, in step S102, the jam removal operation guidance information controller 12 generates inquiry information for inquiring whether to use the other printer 101 different from the printer 1 or not and sends the inquiry information to the wearable terminal 3.

Figure 5:
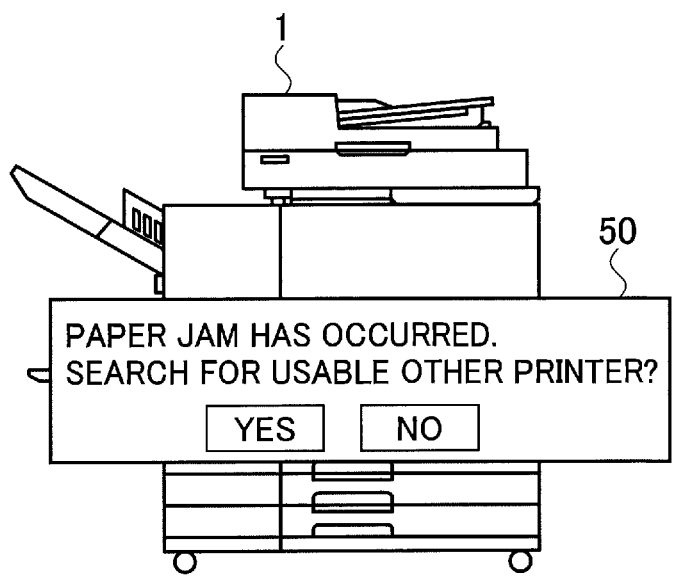
FIG. 5 is a view illustrating an image of the field of view through the wearable terminal.

In this case, the wearable terminal 3 generates a virtual object of the inquiry information and displays the virtual object in a manner superimposed on the actual printer 1 viewed through the display 37. An image of the field of view of the user in this case is illustrated in FIG. 5. For example, the wearable terminal 3 displays a virtual object 50 of the inquiry information stating "Paper jam has occurred. Search for usable other printer?" in front of the actual printer 1. The user can answer "Yes" or "No" in the virtual object 50 by performing a space operation of holding the portion of "Yes" or "No" between two fingers.

Next, in step S103, when the user's answer for the inquiry information is "do not use the other printer 101," the jam removal operation guidance information controller 12 causes the processing to proceed to step S104. Meanwhile, when the answer is "use the other printer 101," the jam removal operation guidance information controller 12 causes the processing to proceed to processing of FIG. 12.

When the answer is "do not use the other printer 101" in step S103, the processing proceeds to step S104 and the jam removal operation guidance information controller 12 obtains the guidance information corresponding to the jam condition from the jam removal operation guidance information database 13 and sends the guidance information to the wearable terminal 3 as the jam removal operation guidance information.

The processing of step S104 is described in detail. Various pieces of guidance information corresponding to multiple jam conditions are stored in the jam removal operation guidance information database 13 while being associated with error IDs. For example, as illustrated in FIG. 6, as the guidance information for removing the jam condition in which a sheet position is "in ink transfer mechanism" and a sheet condition is "wrapped around transfer belt," the jam removal operation guidance information database 13 stores a guidance text (guidance sentence) stating "pull out sheet toward user," a guidance image corresponding to the contents of the guidance text, and a display position of the guidance image ("at end of transfer belt" and "in front of transfer belt", for example).

The printer 1 searches the jam removal operation guidance information database 13 for the guidance information corresponding to the jam condition detected in step S101 to retrieve it and sends the retrieved guidance information to the wearable terminal 3 together with the ID of the printer 1, configuration information and image information on the shape of an internal structure of the printer 1, jam occurrence time information, and the like.

Then, when the jam is removed (YES in step S105), the jam removal operation guidance information controller 12 causes the processing to proceed to step S106. When the jam is not removed (NO in step S105), the jam removal operation guidance information controller 12 returns to step S104 and sends the jam removal operation guidance information again.

In step S106, the jam removal operation guidance information controller 12 sends terminating instruction information to the wearable terminal 3 and terminates the processing.

Figure 7:
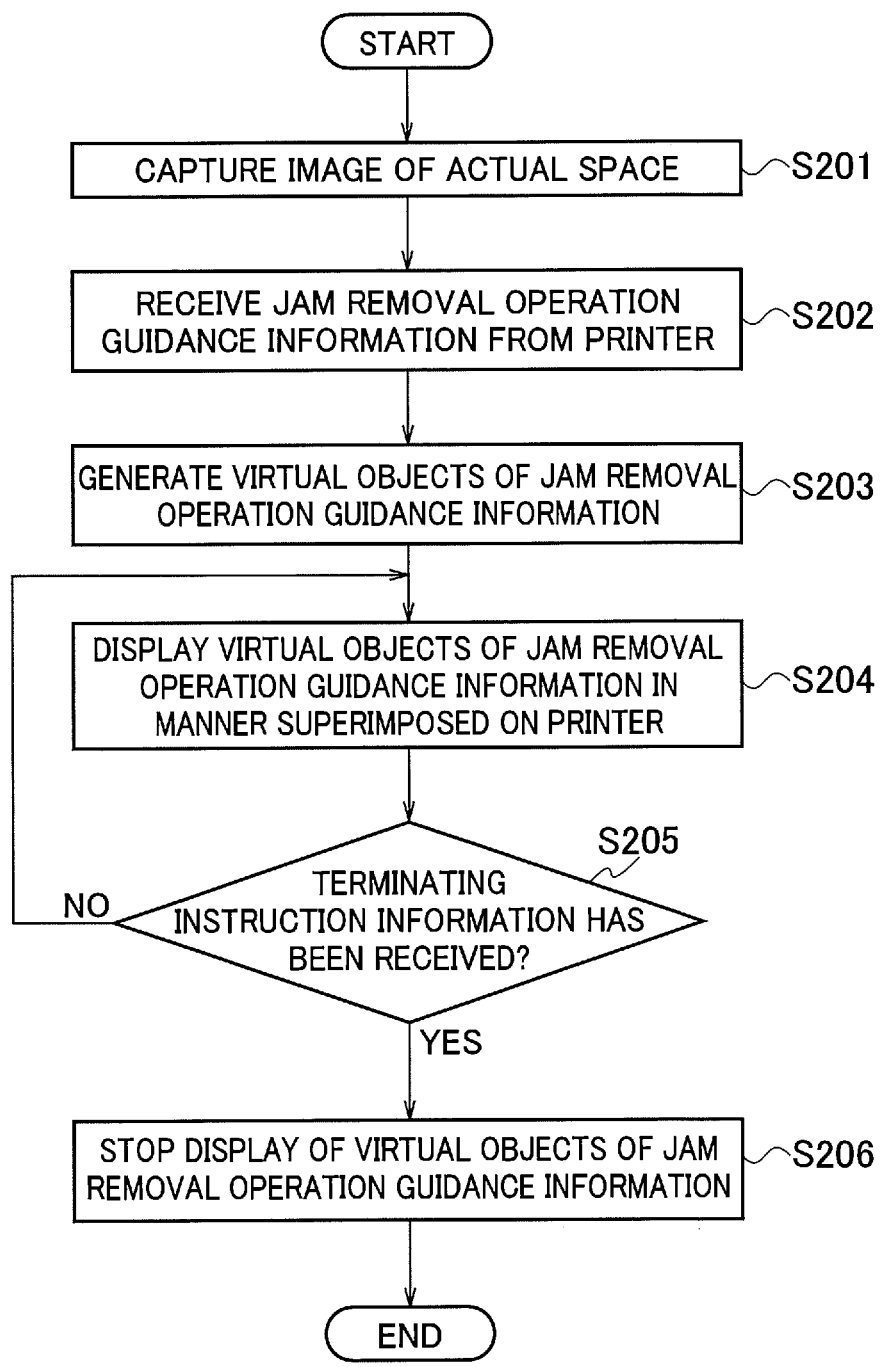
FIG. 7 is a diagram illustrating a processing flow of the wearable terminal in the case where the jam occurs (the case where the other printer is not used).

FIG. 7 is a diagram illustrating a processing flow (operation) of the wearable terminal 3 in the case where the jam occurs (the case where the other printer 101 is not used).

In step S201, image capturing of the actual space by the actual space imager 32 is started by turn-on of the wearable terminal 3 and the actual space recognizer 33 recognizes the actual space captured by the actual space imager 32. In this case, when the user sees the printer 1, the actual space imager 32 captures an image of the printer 1 and the actual space recognizer 33 recognizes the shape and position of the printer 1.

Then, when the virtual object generator 34 receives the jam removal operation guidance information from the printer 1 in step S202, in step S203, the virtual object generator 34 generates virtual objects A which are a guidance text and guidance images included in the jam removal operation guidance information and also generates a virtual object B which is an object with the shape of the internal structure of the printer 1.

Next, in step S204, the display controller 35 displays the virtual objects A at predetermined display positions in the virtual object B and displays the virtual objects A and B in a manner superimposed on the actual printer 1 viewed through the display 37.

Figure 8:
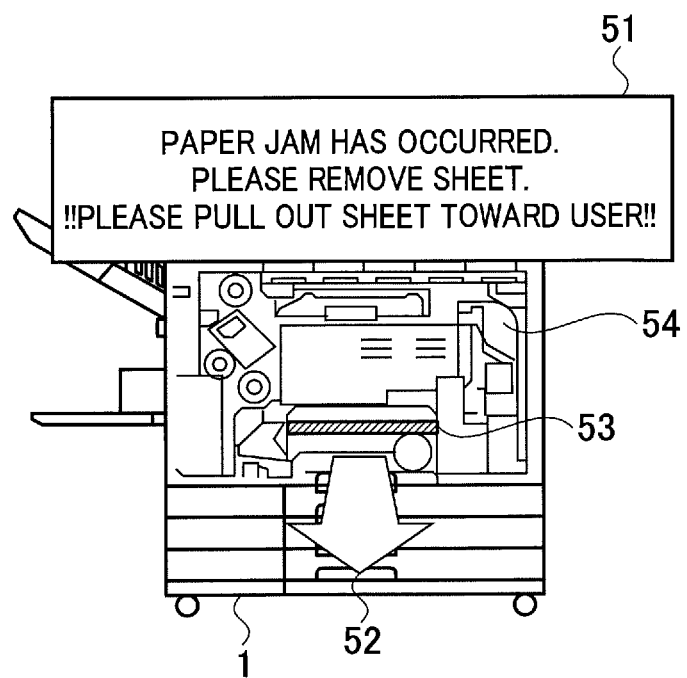
FIG. 8 is a view illustrating an image of the field of view through the wearable terminal.

The processing of steps S202 to S204 is described in detail. The "guidance text and guidance images included in the jam removal operation guidance information" are a guidance text and guidance images used for jam removal. For example, as illustrated in FIG. 8, the guidance text and the guidance image are a guidance text 51 and a guidance image 52 indicating a method of jam removal operation, a guidance image 53 indicating a portion where the jam has occurred, and a guidance image (not illustrated in FIG. 8) indicating a portion which needs to be operated to remove the jam (for example, a lever for taking out a sheet conveyor). The guidance text 51 is, for example, a text stating "Paper jam has occurred. Please remove sheet. Please pull out sheet toward user."

The virtual object generator 34 generates a virtual object A group of these guidance text and guidance images (51 to 53) and superimposes the virtual object A group on the virtual object B which is the object 54 with the shape of the internal structure of the printer 1. The virtual objects A which are the guidance images are aligned at predetermined positions in the virtual object B based on display positions of the guidance images included in the jam removal operation guidance information.

Then, the display controller 35 displays the virtual objects A and B on the display 37 in front of the printer 1 viewed through the transmissive display 37 in a superimposed manner. In this case, the display controller 35 displays the guidance image 53 indicating the portion where the jam has occurred and the guidance image indicating the portion which needs to be operated in a highlighted manner by changing the colors or the like of these guidance images to enable quick jam removal. For example, these guidance images are displayed in a blinking manner.

This allows the user to intuitively understand the portion where the jam has occurred, the portion which needs to be operated to remove the jam, and the method of jam removal operation. Moreover, since the user can recognize the portion where the jam has occurred without opening a front door of the printer 1 in the actual space, execution of needless operations can be prevented.

Then, when the display controller 35 receives the terminating instruction information from the printer 1 (YES in step S205), the display controller 35 causes the processing to proceed to step S206. Meanwhile, when the display controller 35 receives no terminating instruction information from the printer 1 (NO in step S205), the processing returns to step S204 and the display of the jam removal operation guidance information is repeated.

In step S206, the display controller 35 terminates the display of the jam removal operation guidance information (stops display of the virtual objects) and terminates the processing.

(In Maintenance)

Description is given of operations performed when the printer 1 transitions to a maintenance mode in which consumables are managed. When the ink remaining amount becomes low in the printer 1, the wearable terminal 3 receives notification via the communication network and displays the ink replacement guidance information. When the user sees the printer 1 through the wearable terminal 3, the position of the target ink or the like is displayed in a highlighted manner. A specific example of the processing is described below.

Figure 9:
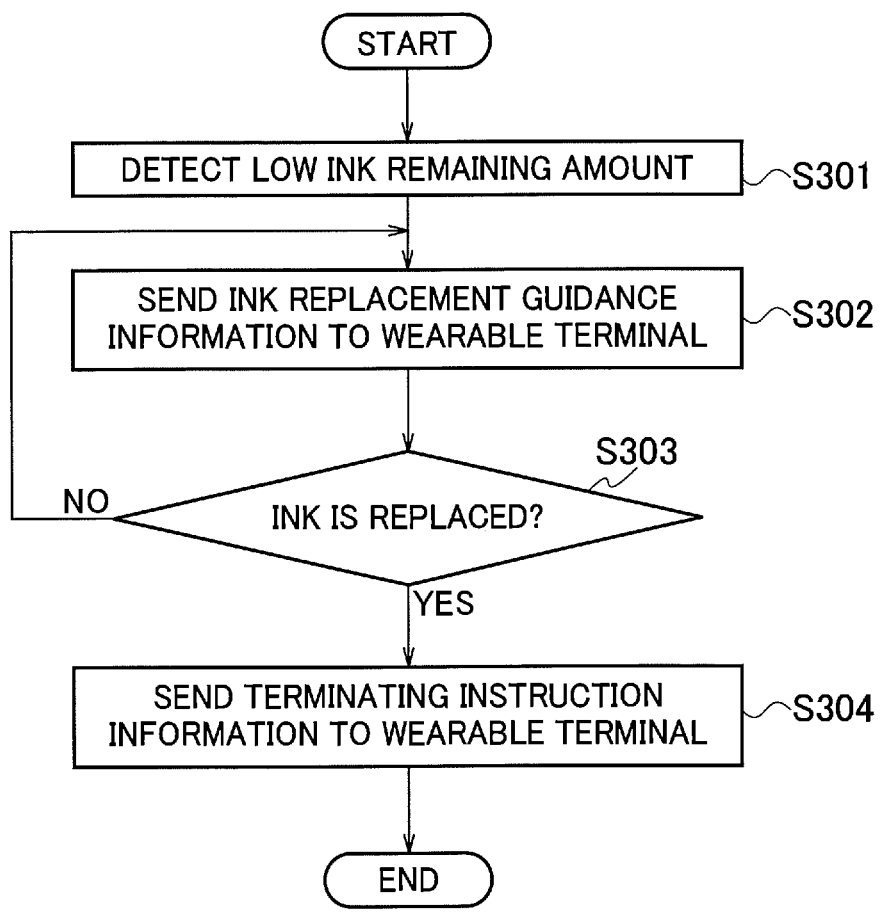
FIG. 9 is a diagram illustrating a processing flow of the printer in a maintenance mode.

FIG. 9 is a view illustrating a processing flow (operation) of the printer 1 in the maintenance mode.

When the low ink remaining amount detector 14 detects that the ink remaining amount has reached or fallen below the threshold in step S301, in step S302, the ink replacement guidance information controller 15 sends the ink replacement guidance information used for ink replacement to the wearable terminal 3. The ink replacement guidance information includes, for example, the ID of the printer 1, the position of a target ink which needs to be replaced, a guidance text (guidance sentence) stating "Ink remaining amount is low. Please prepare spare ink," a guidance image corresponding to the contents of the guidance text (for example, an image of a cartridge of the target ink), configuration information and image information on the shape of the internal structure of the printer 1, low ink remaining amount detection time, and the like.

Then, when the ink is replaced (YES in step S303), the ink replacement guidance information controller 15 causes the processing to proceed to step S304. Meanwhile, when the ink is not replaced (NO in step S303), the ink replacement guidance information controller 15 causes the processing to return to step S302 and sends the ink replacement guidance information again.

In step S304, the jam removal operation guidance information controller 12 sends the terminating instruction information to the wearable terminal 3 and terminates the processing.

Figure 10:
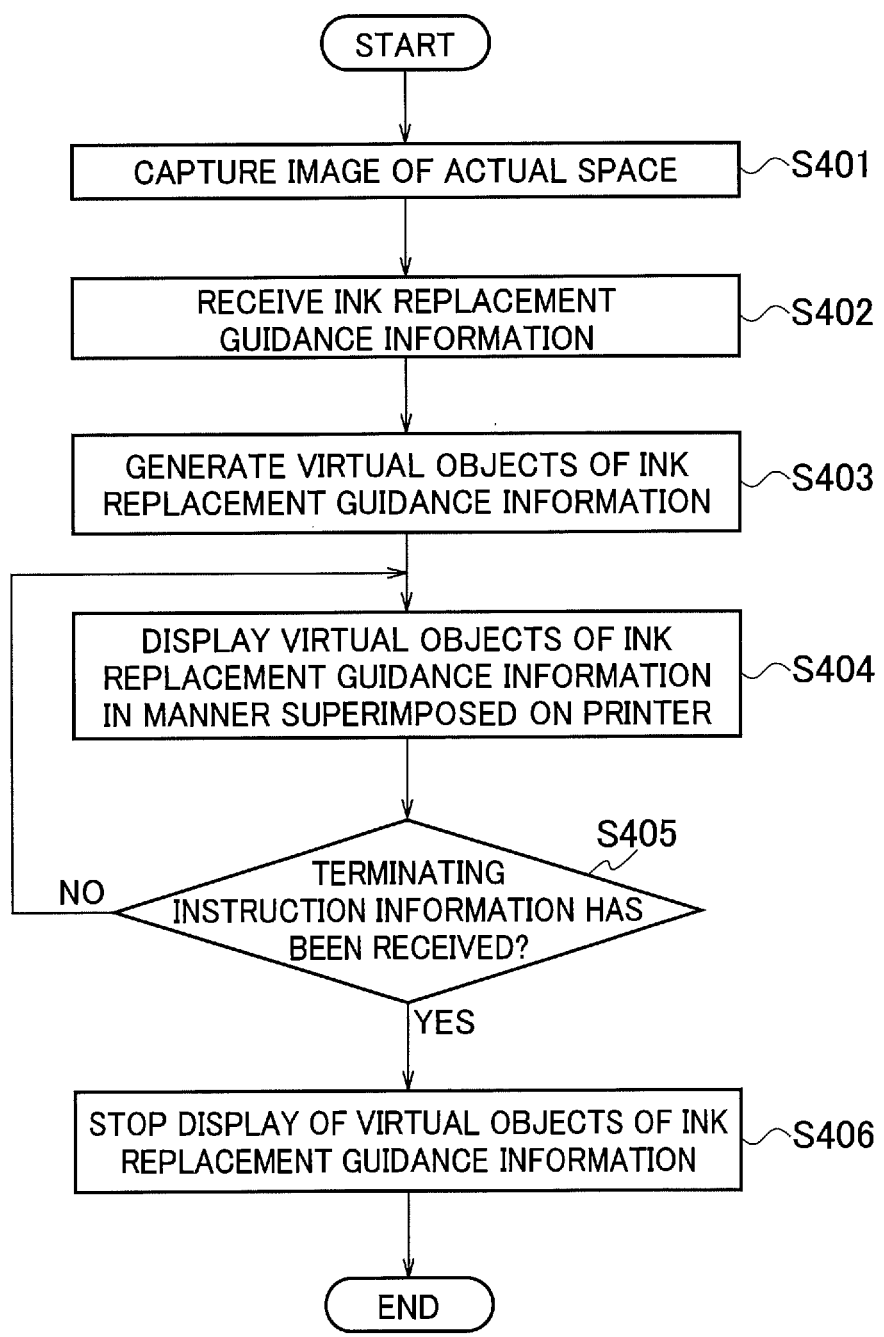
FIG. 10 is a diagram illustrating a processing flow of the wearable terminal 3 in the maintenance mode.

FIG. 10 is a diagram illustrating a processing flow (operation) of the wearable terminal 3 in the maintenance mode.

In step S401, image capturing of the actual space by the actual space imager 32 is started by turn-on of the wearable terminal 3 and the actual space recognizer 33 recognizes the actual space captured by the actual space imager 32.

Then, when the virtual object generator 34 receives the ink replacement guidance information from the printer 1 in step S402, in step S403, the virtual object generator 34 generates virtual objects A which are a guidance text and guidance images included in the ink replacement guidance information and also generates the virtual object B which is the object with the shape of the internal structure of the printer 1.

Next, in step S404, the display controller 35 displays the virtual objects A at predetermined display positions in the virtual object B and displays the virtual objects A and B in a manner superimposed on the actual printer 1 viewed through the display 37.

Figure 11:
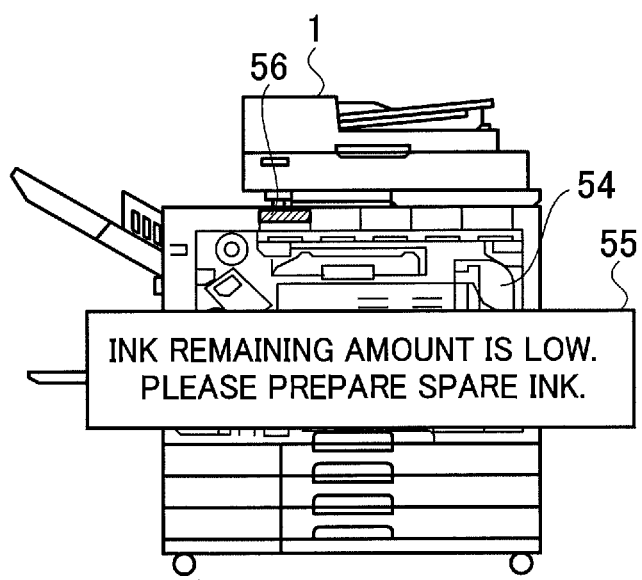
FIG. 11 is a view illustrating an image of the field of view through the wearable terminal.

The processing of steps S402 to S404 is described in detail. The "guidance text and guidance images included in the ink replacement guidance information" are a guidance text and guidance images used for ink replacement. For example, as illustrated in FIG. 11, the guidance text and the guidance images are a guidance text 55 prompting the user to replace the ink, a guidance image 56 indicating the position of the replacement target ink, and a guidance image (not illustrated in FIG. 11) indicating the method of ink replacement operation. The guidance text 55 is, for example, a text stating "Ink remaining amount is low. Please prepare spare ink."

The virtual object generator 34 generates a virtual object A group of these guidance text and guidance images (55, 56) and superimposes the virtual object A group on the virtual object B which is the object 54 with the shape of the internal structure of the printer 1. Then, the display controller 35 displays the virtual objects A and B on the display 37 in front of the printer 1 viewed through the transmissive display 37 in a superimposed manner. In this case, the display controller 35 displays the guidance image 56 indicating the position of the replacement target ink in a highlighted manner by changing the colors or the like of the guidance image 56 to allow the user to quickly grasp the replacement target ink. For example, the guidance image 56 is displayed in a blinking manner.

Then, when the display controller 35 receives the terminating instruction information from the printer 1 (YES in step S405), the display controller 35 causes the processing to proceed to step S406. Meanwhile, when the display controller 35 receives no terminating instruction information from the printer 1 (NO in step S405), the processing returns to step S404 and the display of the ink replacement guidance information is repeated.

In step S406, the display controller 35 terminates the display of the ink replacement guidance information (stops display of the virtual objects) and terminates the processing.

(In Occurrence of Jam; Directing of User)

Description is given of an operation of directing the user to the other printer 101 when the jam occurs. As described above, when the jam occurs in the printer 1, the wearable terminal 3 receives notification via the communication network. When the user determines to use the other printer 101 in this case, the wearable terminal 3 displays guidance for directing the user to the usable other printer 101. A specific example of the processing is described below.

Figure 12:
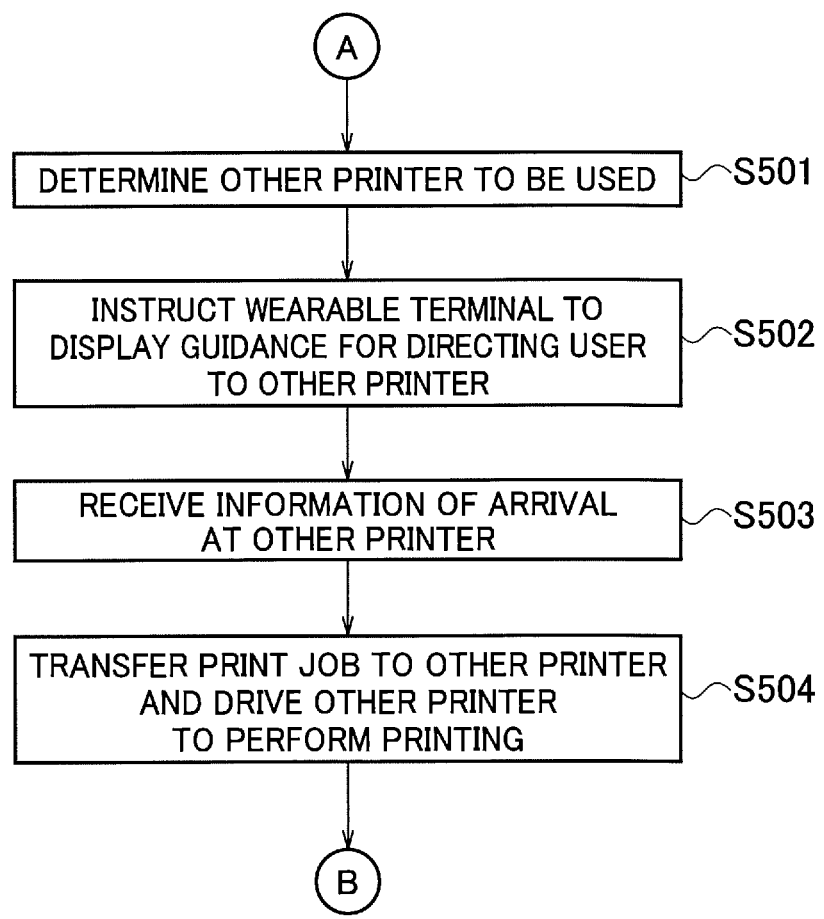
FIG. 12 is a diagram illustrating a processing flow (user directing processing flow) of the printer in the case where the jam occurs (the case where the other printer is used).

FIG. 12 is a diagram illustrating a processing flow (operation) (user directing processing flow) of the printer 1 in the case where the jam occurs (the case where the other printer 101 is used).

When the user determines to use the other printer 101 in step S103 of FIG. 4, in step S501, the other printer directing information controller 17 searches the other printer information database 18 for the usable other printer 101 to determine the usable other printer 101. For example, the other printer information database 18 stores other printer information illustrated in FIG. 13 and the other printer directing information controller 17 determines a printer which matches print specifications (for example, color and the like) in the print job of suspended printing and which is closest to the printer 1 as the other printer 101 to which the user is to be directed.

Then, in step S502, the other printer directing information controller 17 sends the user directing information used to direct the user to the other printer 101 determined in step S501 to the wearable terminal 3. The user directing information includes the ID, position information, and the like of the other printer 101.

Next, in step S503, the print job controller 19 receives arrival information indicating that the user has arrived at the other printer 101 from the wearable terminal 3, and then obtains the print job of suspended printing from the print job storage 20. Then, in step S504, the print job controller 19 transfers the obtained print job to the other printer 101 and causes the other printer 101 to perform printing based on the print job. Thereafter, the processing proceeds to the termination block in FIG. 4 and the processing is terminated.

Figure 14:
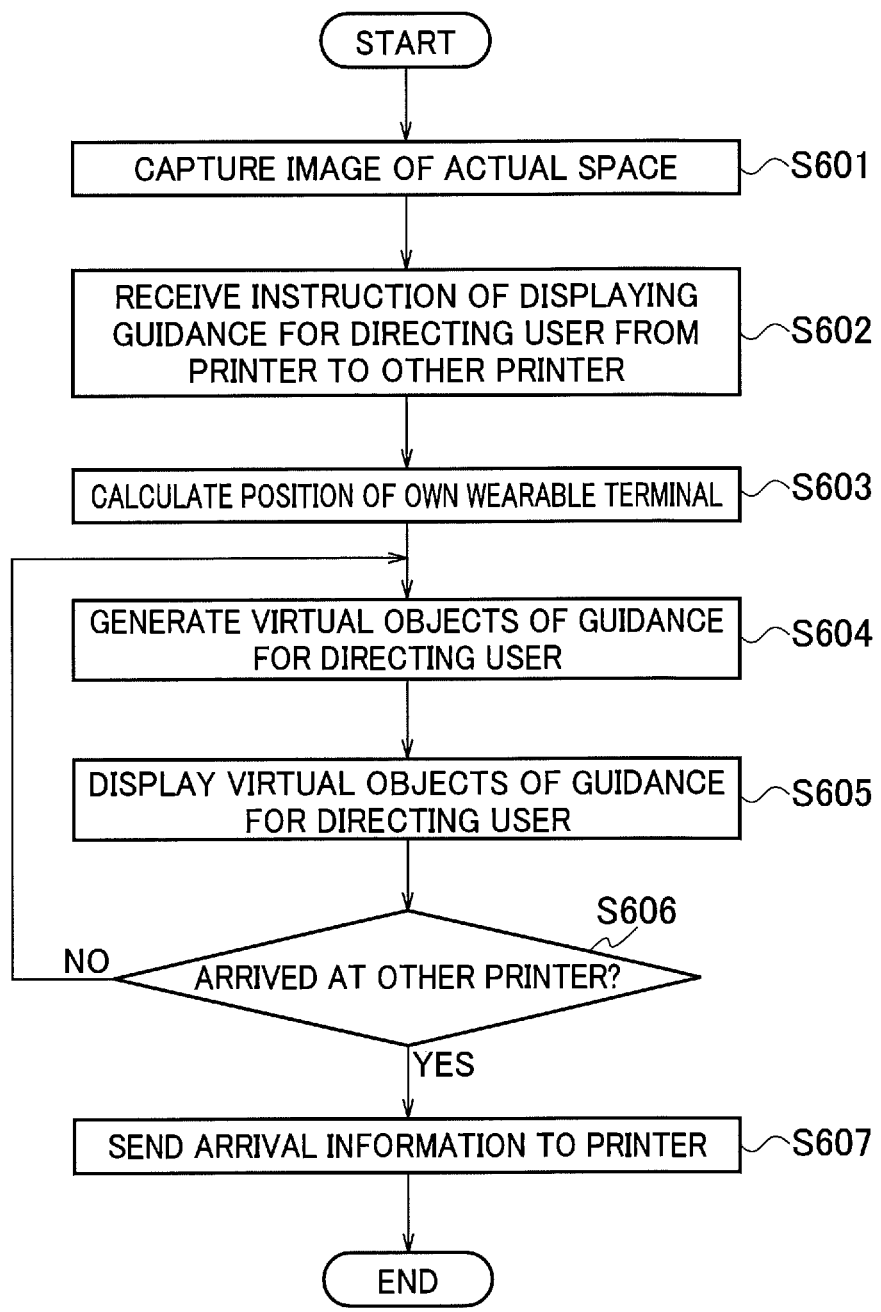
FIG. 14 is a diagram illustrating a processing flow (user directing processing flow) of the wearable terminal in the case where the jam occurs (the case where the other printer is used).

FIG. 14 is a diagram illustrating a processing flow (operation) (user directing processing flow) of the wearable terminal 3 in the case where the jam occurs (the case where the other printer 101 is used).

In step S601, image capturing of the actual space by the actual space imager 32 is started by turn-on of the wearable terminal 3 and the actual space recognizer 33 recognizes the actual space captured by the actual space imager 32.

When the position calculator 36 receives user directing information from the printer 1 in step S602, in step S603, the position calculator 36 calculates the position of the own wearable terminal 3. For example, the position calculator 36 assumes that the entire floor is a plane of a x-y coordinate system, sets one of four corners of the floor as an origin, and calculates (x, y) coordinates of the wearable terminal 3 relative to the origin. Generally, the MR device used as the wearable terminal 3 is capable of calculating the position of itself by using an absolute coordinate system, a relative coordinate system, and the like. When the processing load of calculating the position relative to the origin is excessively large, the position calculator 36 may obtain a current terrestrial position from GPS and use it.

Next, in step S604, the virtual object generator 34 obtains the direction from the current position of the user (=position of the wearable terminal 3) toward the other printer 101 by using the position information of the wearable terminal 3 calculated in step S603 and the position information of the other printer 101 included in the user directing information and generates a virtual object which is a guidance image pointing in the obtained direction. Then, in step S605, the display controller 35 displays the virtual object generated in step S604 on the display 37.

Next, in step S606, the position calculator 36 determines whether an approach distance between the current position of the wearable terminal 3 and the position of the other printer 101 reaches or falls below a threshold. When the approach distance reaches or falls below the threshold (YES in step S606), the position calculator 36 assumes that the user has arrived at the other printer 101 and the processing proceeds to step S607. Meanwhile, when the approach distance does not reach or fall below the threshold (NO in step S606), the processing returns to step S604 and steps S604 to S606 are repeated until the approach distance reaches or falls below the threshold.

Figure 15:
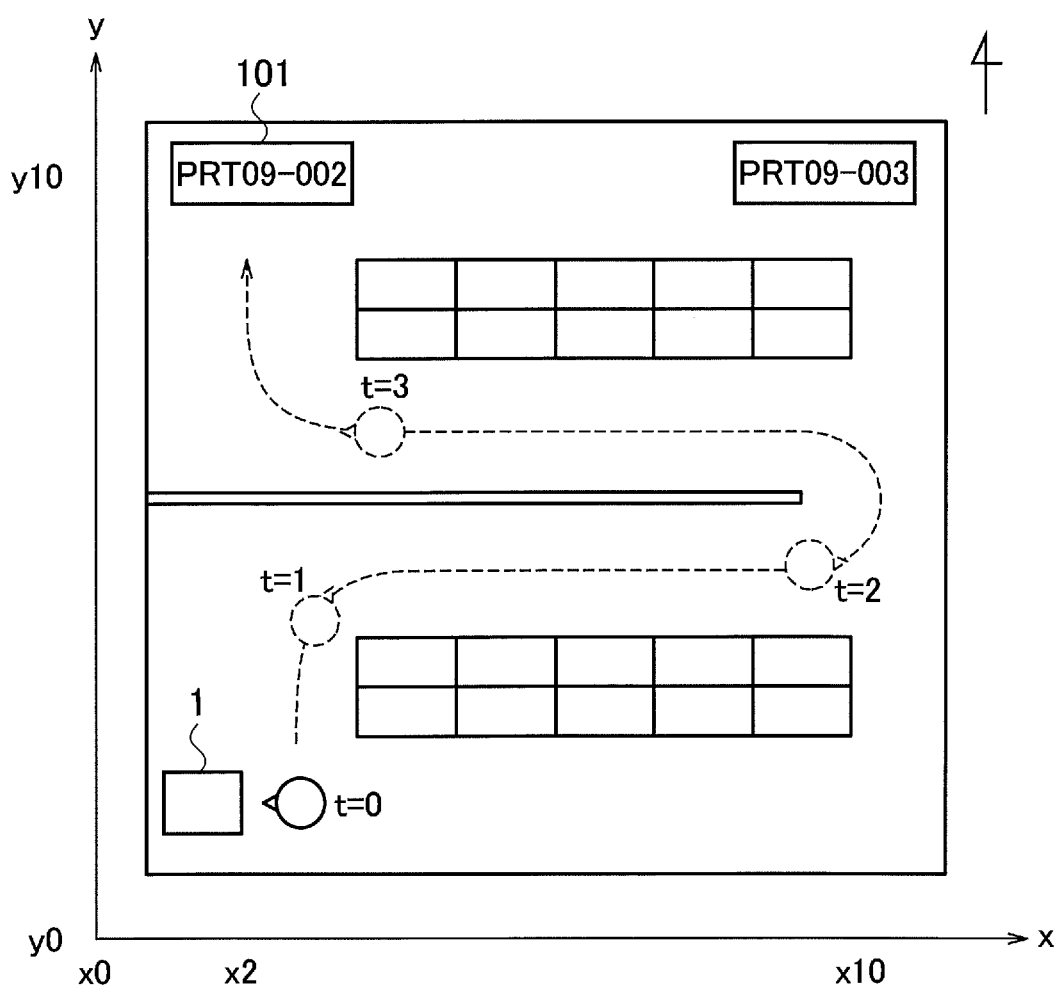
FIG. 15 is a view illustrating an example of user directing by using a top view of a floor.
Figure 16:
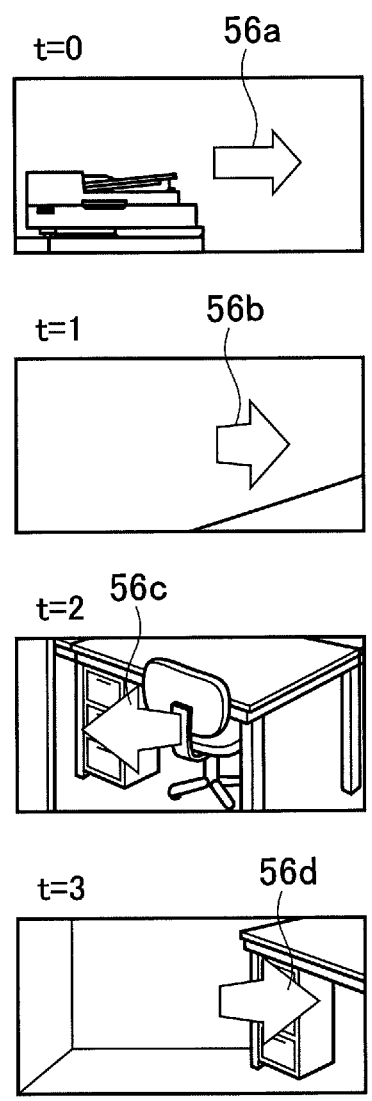
FIG. 16 is a view illustrating images of the field of view through the wearable terminal in the case where the user directing illustrated in FIG. 15 is performed.

The processing of steps S604 to S602 is described in detail. For example, assume a case where the printer 1 and the other printer 101 are arranged respectively for different departments in the same floor (for example, the ninth floor) as illustrated in FIG. 15. At a time point t=0, the user is facing west beside the printer 1 and, in this case, the other printer 101 is on the right side as seen from the user. Accordingly, as illustrated in FIG. 16, a guide image 56a pointing rightward is displayed. At a time point t=1, the other printer 101 is on the front-left side as seen from the user. However, a wall is in the field of view of the user. Accordingly, when the actual space recognizer 33 recognizes the wall, as illustrated in FIG. 16, a guide image 56b pointing in a direction toward a portion without the wall is displayed. Then, at a time point t=2, as illustrated in FIG. 16, a guide image 56c pointing in the forward-left direction is displayed and, at a time point t=3, as illustrated in FIG. 16, a guide image 56d pointing in the forward-right direction is displayed. For example, the wearable terminal 3 displays the guide image until the approach distance to the other printer 101 reaches or falls below 1 m.

In step S607, the virtual object generator 34 sends the arrival information to the printer 1 and terminates the processing. When the arrival information is sent, the print job is transferred from the printer 1 to the other printer 101 and the other printer 101 performs printing.

When another printer or an object with a shape similar to the printer 1 is arranged adjacent to the printer 1, the wearable terminal 3 may erroneously recognize this other printer or the like as the printer 1 for which the guidance information is to be displayed. In such a case, additional information such as an AR marker or a QR code may be attached to a housing outer surface of the printer 1 to allow the wearable terminal 3 to surely identify the printer 1 being the target. The wearable terminal 3 displays the jam removal operation guidance information and the like for the printer 1 having the additional information matching the ID of the printer 1 received via the communication network. This can prevent erroneous recognition of the printer.

Although the case where the print job transfer processing of step S504 is performed after step S503 is described in FIG. 12, step S504 may be performed at the timing of step S502. This allows the print processing to be completed before the arrival of the user and time of waiting for the completion of print processing in the other printer 101 can be saved.

According to the embodiment, the printer 1 sends the guidance information for removing the detected errors to the wearable terminal 3 and the wearable terminal 3, which has the transmissive display configured to be fixed in front of the eyes of the user, receives the guidance information from the printer 1 and displays, on the display, the virtual objects of the received guidance information for the actual printer 1 viewed through the transmissive display. This allows the user to operate the printer 1 with both hands and the operability of the printer 1 in error removal can be improved. Moreover, since the method of error removal operation is not printed on a sheet, the sheet and the ink can be saved. Furthermore, there is no need to move the line of sight and the body between the operation panel provided in the printer 1 and the portion where the error is to be removed.

According to the embodiment, on the display, the wearable terminal 3 displays the jam removal operation guidance information indicating the portion where the jam has occurred in a manner highlighted and superimposed on the printer 1, displays the jam removal operation guidance information indicating the portion which needs to be operated to remove the jam in a manner highlighted and superimposed on the printer 1, and displays the jam removal operation guidance information indicating the method of jam removal operation. This allows the user to intuitively understand the portion where the jam has occurred and the method of jam removal operation and the operability of the printer 1 in the error removal can be further improved.

According to the embodiment, on the display, the wearable terminal 3 displays the guidance information (for example, ink replacement guidance information) indicating the portion requiring maintenance in a manner highlighted and superimposed on the printer 1 and displays the guidance information (for example, ink replacement guidance information) indicating the method of maintenance operation. This allows the user to intuitively understand the portion requiring maintenance and the method of maintenance operation and the operability of the printer 1 in the error removal can be further improved.

According to the embodiment, the wearable terminal 3 displays the position of the consumables requiring maintenance in a highlighted manner. This allows the user to intuitively understand the position of the consumables which need to be replaced and the operability of the printer 1 in the error removal can be further improved.

According to the embodiment, the wearable terminal 3 displays the user directing information for directing the user to the other printer 101 different from the printer 1. Accordingly, it is possible to surely perform the print processing of the print job requested by the user and handle cases such as where printing needs to be performed immediately.

According to the embodiment, the wearable terminal 3 displays the virtual objects A of the guidance information used to remove the error of the printer 1 and the virtual object B of the internal structure of the printer 1 in front of the actual printer 1 viewed through the display in a superimposed manner. This allows the user to understand the portion where the jam has occurred without opening the front door of the printer 1. Thus, it is possible to prevent execution of needless operations and quickly perform the jam removal.

The printer 1 and the wearable terminal 3 described in the embodiment can be implemented by using a computer including a memory (computer-readable recording medium) and a CPU (processor). Moreover, it is possible to construct processing procedures of the printer 1 and the wearable terminal 3 as a program, install the program in a computer to execute it, and distribute the program via a communication network.

Furthermore, the printer 1 is an example of an image forming apparatus configured to form images of print target data. An enclosing-sealing apparatus and the like accompanying the printer 1 may be included in apparatuses which are the target of this disclosure.

The embodiments of the present disclosure have, for example, the following configurations.

A print system includes an image forming apparatus and a wearable terminal configured to communicate with the image forming apparatus. The image forming apparatus includes a detector configured to detect an error and a controller configured to send a guidance information used to remove the error to the wearable terminal. The wearable terminal includes a transmissive display, a fixing portion configured to fix the transmissive display in front of eyes of a user, a communication unit configured to receive the guidance information, and a display controller configured to display the guidance information on the transmissive display for the image forming apparatus viewed through the transmissive display.

The display controller may be configured to perform at least one of operations of: displaying the guidance information indicating a portion where jam has occurred on the transmissive display in a manner highlighted and superimposed on the image forming apparatus; displaying the guidance information indicating a portion which needs to be operated to remove the jam on the transmissive display in a manner highlighted and superimposed on the image forming apparatus; and displaying the guidance information indicating a method of an operation of removing the jam on the transmissive display.

The display controller may be configured to perform at least one of operations of: displaying the guidance information indicating a portion requiring maintenance on the transmissive display in a manner highlighted and superimposed on the image forming apparatus; and displaying the guidance information indicating a method of an operation of the maintenance on the transmissive display.

The display controller may be configured to display a position of consumables requiring the maintenance on the transmissive display in a highlighted manner.

The display controller may be configured to display an information for directing the user to an another image forming apparatus other than the image forming apparatus on the transmissive display.

An image forming apparatus includes a detector configured to detect an error and a controller configured to send a guidance information used to remove the error to a wearable terminal.

A wearable terminal includes: a transmissive display; a fixing portion configured to fix the transmissive display in front of eyes of a user; a communication unit configured to receive a guidance information used to remove an error in an image forming apparatus; and a display controller configured to display the guidance information on the transmissive display for the image forming apparatus viewed through the transmissive display.

A computer-readable storage medium stores a program for causing a computer to execute a process, the process including: driving a wearable terminal to receive a guidance information used to remove an error in an image forming apparatus, the wearable terminal including a transmissive display and a fixing portion configured to fix the transmissive display in front of eyes of a user; and driving the wearable terminal to display the guidance information indicating a portion which needs to be operated to remove the error on the transmissive display in a manner highlighted and superimposed on the image forming apparatus or display the guidance information indicating a method of an operation of removing the error on the transmissive display, for the image forming apparatus viewed through the transmissive display.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. A print system comprising:
   an image forming apparatus; and
   a wearable terminal configured to communicate with the image forming apparatus, wherein
   the image forming apparatus comprises:
      a detector configured to detect an error in the image forming apparatus; and
      a controller configured to send a guidance information used to remove the error to the wearable terminal,
      an other printer information database that stores information on at least one other image forming apparatus; and
      an other printer directing information controller in communication with the other printer information database and configured to search the other printer information database for a useable image forming apparatus other than the image forming apparatus to determine an another image forming apparatus upon a user determining to use an image forming apparatus other than the image forming apparatus and configured to send to the wearable terminal directing information used to direct the user to the determined another image forming apparatus; wherein
   the directing information is transmitted by the image forming apparatus to the wearable terminal and is used by a position calculator of the wearable terminal to calculate a position of the wearable terminal,
   the directing information includes a position information of the another image forming apparatus, and the position information of the another image forming apparatus and the position of the wearable terminal are useable by a virtual object generator of the wearable terminal to obtain a direction from a current position of the user toward the another image forming apparatus and to generate a virtual object which is a guidance image, and
   the virtual object is displayable by a display controller of the wearable terminal on a transmissive display of the wearable terminal; and
   the wearable terminal comprises:
      the transmissive display;
      a fixing portion configured to fix the transmissive display in front of eyes of the user;
      a communication unit configured to receive the guidance information and the directing information; and
      the display controller configured to display the guidance information and the directing information on the transmissive display for the image forming apparatus viewed through the transmissive display.

2. The print system according to claim 1, wherein the display controller is configured to perform at least one of the following operations:
   displaying the guidance information indicating a portion where jam has occurred on the transmissive display in a manner highlighted and superimposed on the image forming apparatus;
   displaying the guidance information indicating a portion which needs to be operated to remove the jam on the transmissive display in a manner highlighted and superimposed on the image forming apparatus; and
   displaying the guidance information indicating a method of an operation of removing the jam on the transmissive display.

3. The print system according to claim 1, wherein the display controller is configured to perform at least one of the following operations:
   displaying the guidance information indicating a portion requiring maintenance on the transmissive display in a manner highlighted and superimposed on the image forming apparatus; and
   displaying the guidance information indicating a method of an operation of the maintenance on the transmissive display.

4. The print system according to claim 3, wherein the display controller is configured to display a position of a consumable requiring maintenance on the transmissive display in a highlighted manner.

5. An image forming apparatus comprising:
   a detector configured to detect an error in the image forming apparatus;
   a controller configured to send a guidance information used to remove the error to a wearable terminal;
   an other printer information database that stores information on at least one other image forming apparatus; and
   an other printer directing information controller in communication with the other printer information database and configured to search the other printer information database for a useable image forming apparatus other than the image forming apparatus to determine an another image forming apparatus upon a user determining to use an image forming apparatus other than the image forming apparatus and configured to send to the wearable terminal directing information used to direct the user to the determined another image forming apparatus, wherein
   the directing information is transmitted by the image forming apparatus to the wearable terminal and is used by a position calculator of the wearable terminal to calculate a position of the wearable terminal,
   the directing information includes a position information of the another image forming apparatus, and the position information of the another image forming apparatus and the position of the wearable terminal are useable by a virtual object generator of the wearable terminal to obtain a direction from a current position of the user toward the another image forming apparatus and to generate a virtual object which is a guidance image, and
   the virtual object is displayable by a display controller of the wearable terminal on a transmissive display of the wearable terminal.

6. The image forming apparatus according to claim 5, further comprising a guidance information database that stores guidance text and guidance images.

7. The image forming apparatus of claim 5, wherein the stored information in the other printer information database comprises for each other image forming apparatus: a unique identifier, a unique name, a type, position information and a floor.

8. The image forming apparatus of claim 5, wherein the another image forming apparatus has print specifications that match print specifications of the image forming apparatus.

9. The image forming apparatus of claim 5, wherein the controller is configured to receive a notice from the wearable terminal when the wearable terminal arrives at the another image forming apparatus, and in response to receiving the notice the controller is configured to transfer a print job to the another image forming apparatus.

* * * * *